United States Patent [19]
Citterio

[11] Patent Number: 5,592,338
[45] Date of Patent: Jan. 7, 1997

[54] GRAZING INCIDENCE CO-AXIAL AND CONFOCAL

[75] Inventor: Oberto Citterio, Merate, Italy

[73] Assignee: Osservatorio Astronomico di Brera, Milan, Italy

[21] Appl. No.: 397,768

[22] Filed: Mar. 2, 1995

[30] Foreign Application Priority Data

Mar. 4, 1994 [IT] Italy ................... MI94A0403

[51] Int. Cl.$^6$ .................................. G02B 5/08
[52] U.S. Cl. ......................... 359/883; 359/867
[58] Field of Search .................. 359/867, 869, 359/871, 883

[56]  References Cited

U.S. PATENT DOCUMENTS

| | | | |
|---|---|---|---|
| 3,378,469 | 4/1968 | Jochim | 359/883 |
| 4,239,344 | 12/1980 | Wildenrotter | 359/883 |
| 4,370,750 | 1/1983 | Hoover | 378/43 |
| 4,554,197 | 11/1985 | Chyung et al. | 428/113 |

FOREIGN PATENT DOCUMENTS 0343861 11/1989 European Pat. Off. .
1045016 10/1966 United Kingdom .

OTHER PUBLICATIONS

Database WPI—Week 8426—Derwent Publications Ltd., London,GB; AN 84-162145 & JP-A-59 087 404 (Hitachi) May 21, 1984 *abstract*.
Patent Abstracts of Japan, vol. 14 No. 463 (E-988) Oct. 8, 1990 & JP-A-02 188908 (Fujitsu) Jul. 25, 1990 *abstract*.
Database WPI—Week 8822—Derwent Publications Ltd., London, GB; AN 88-151682 & JP-A-63 092 915 (Ibiden), Apr. 23, 1988 *abstract*.

*Primary Examiner*—Timothy P. Callahan
*Assistant Examiner*—Jeffrey Zweizig
*Attorney, Agent, or Firm*— Bucknam and Archer

[57] ABSTRACT

Grazing incidence co-axial and confocal mirrors, used in particular for X-ray telescopes for astronomic observations, having a parabola/hyperbola double-cone truncated-cone structure, with polynomial sections or other geometric configurations, and consisting of an internal reflecting surface (15), in the form of a gold layer, an epoxy resin layer (14) and a supporting mechanical structural element (carrier) (11), formed of a ceramic material having physical-chemical properties improved compared to nickel and obtained according to the process of chemical vapor deposition (CVD) or other fabrication processes.

11 Claims, 2 Drawing Sheets

Fig. 3

| MATERIAL | SPECIFIC WEIGHT ρ (kgm⁻³·10³) | THERMAL EXPANSION COEFFICIENT (TEC) α (K⁻¹·10⁻⁶) | SPECIFIC HEAT c (Jkg⁻¹K⁻¹) | THERMAL CONDUCTIV. k (Wm⁻¹K⁻¹) | MODULUS OF ELASTICITY E (GPa) | THERMAL DISTORSION PARAMETER kα⁻¹ (W·⁻¹·10⁷) | SPECIFIC STIFFNESS E·ρ⁻¹ (MNkg⁻¹·10⁶) |
|---|---|---|---|---|---|---|---|
| Nickel | 8,8 | 14 | — | 90 | 150 | 0,6 | 17 |
| SiC (CVD) | 3,21 | 2,4 | 700 | 250 | 466 | 10,4 | 145 |
| BN (CVD) | 2,0 | 4,7 | — | 1,300 | 646 | 28 | 323 |
| SiC + Si (CERAFORM) | 2,92 | 2,6 | — | 156 | 310 | 6,0 | 106 |

GRAZING INCIDENCE CO-AXIAL AND CONFOCAL

FIELD OF THE INVENTION

The present invention relates to grazing incidence co-axial and confocal mirrors. More particularly, the present invention relates to grazing incidence co-axial and confocal mirrors particularly suitable to be used in X-ray telescopes for astronomic observations.

DESCRIPTION OF THE PRIOR ART

The optics of X-ray telescopes for astronomic observations are composed of a plurality of co-axial and confocal mirrors, having a parabola/hyperbola double cone truncated cone structure, with polynomial sections or other geometric configurations. Such mirrors are inserted into one another so as to form a very compact group; they are provided with an internal reflecting surface consisting of a very thin gold layer; and they require extremely accurate technological preparation and they must have special physical characteristics. In particular, such mirrors must have reflective surfaces whose geometry and roughness are provided for in the optical design and they must have extremely thin walls, in order to minimize the loss of collection surface.

The material utilized for such mirrors must also have the following properties:

a) A high modulus of elasticity in order to have sufficient stiffness with thin thickness of the mirrors;

b) A very low density to reduce weight as much as possible as X-ray telescopes must operate in space;

c) A very low coefficient of thermal expansion and a very high coefficient of thermal conductivity in order to minimize optical distortions due to temperature; and d) The possibility of being utilized in a replica grating process, this being the only process allowing, thanks to the thin walls, the realization of mirrors having high optical qualities starting from spindles which present the negative of the section required for X-ray optics.

As is known, optical systems for X-ray telescopes are produced utilizing nickel as the mechanical structural element for the reflecting material in a replica grading process through electromolding. In this process, spindles covered by a thin layer (typically 150 um) of electrochemical nickel (Kanigen) are used and are optically worked until the geometric sections and the degree of roughness (less than 1 nm RMS) required by the optical design are reached. On the worked spindle, a layer of nickel having a thickness of 0.5–1.5 mm is then deposited by electromolding. The mirror so obtained, consisting of nickel deposited on gold is then separated from the spindle by cooling the latter. Separation is facilitated by the fact that the coefficient of thermal expansion of the aluminium spindle is greater than that of nickel and by the fact that adhesion of gold on electrolitic nickel is much greater than adhesion of gold deposited on the aluminium spindle.

However, this prior art replica grating technology through electromolding has drawbacks which limit its utilization in designs requiring very high optical image quality. These drawbacks include, among others:

a) A very heavy optical system due to the use of nickel as a mechanical structural element, since nickel is a metal having a rather high specific weight (8,8 g/cm$^3$); and b) Limited optical quality of the reflecting surfaces because of the deformations due to internal tensions produced during the electromolding process and the distortions due to the thermal gradients which form because of the high coefficient of thermal expansion and the low thermal conductivity of nickel.

SUMMARY OF THE INVENTION

The primary object of the present invention is to overcome the above described drawbacks. More particularly, object of the present invention is to overcome the drawbacks characteristic of the mirrors produced from nickel according to the electromolding replica grating process. More generally, the present invention permits achievement of the aforementioned objects by utilizing supporting mechanical structural elements (carriers) produced according to the chemical vapour deposition process or other fabrication processes, from ceramic material having improved physical-chemical properties compared to nickel.

According to the present invention, the supporting mechanical structural elements are produced from ceramic material having a specific weight lower than 8.8 kg m$^{-3}$10$^3$, preferably between 2 and 4; a coefficient of thermal expansion lower than 14 H$^{-1}$10$^{-6}$, preferably between 2 and 5; a thermal conductivity greater than 90 W m$^{-1}$K$^{-1}$, preferably between 150 and 1300; a modulus of elasticity greater than 150 G Pa, preferably between 300 and 700; a thermal distortion parameter greater than 0.60 W m$^{-1}$10$^7$; a specific rigidity greater than 17 MN kg$^{-1}$10$^6$, preferably between 100 and 350. Such carriers are suitable for utilization in a replica grating process with epoxy resin on a spindle of aluminium or other equivalent material. Such a replica grating process is known and experiments have already been made on berillium carriers and carriers of plastic material reinforced with carbon fibres.

BRIEF DESCRIPTION OF THE DRAWING

The present invention will be better understood through the following description wherein reference is made to the attached drawings which represent an embodiment given by way of non-limiting example of the invention, and wherein:

FIG. 3 is a table listing the physical-chemical properties of some ceramic materials utilized for the fabrication of said carriers compared to those of nickel.

DESCRIPTION OF THE PREFERRED EMBODIMENT

Figure 1:
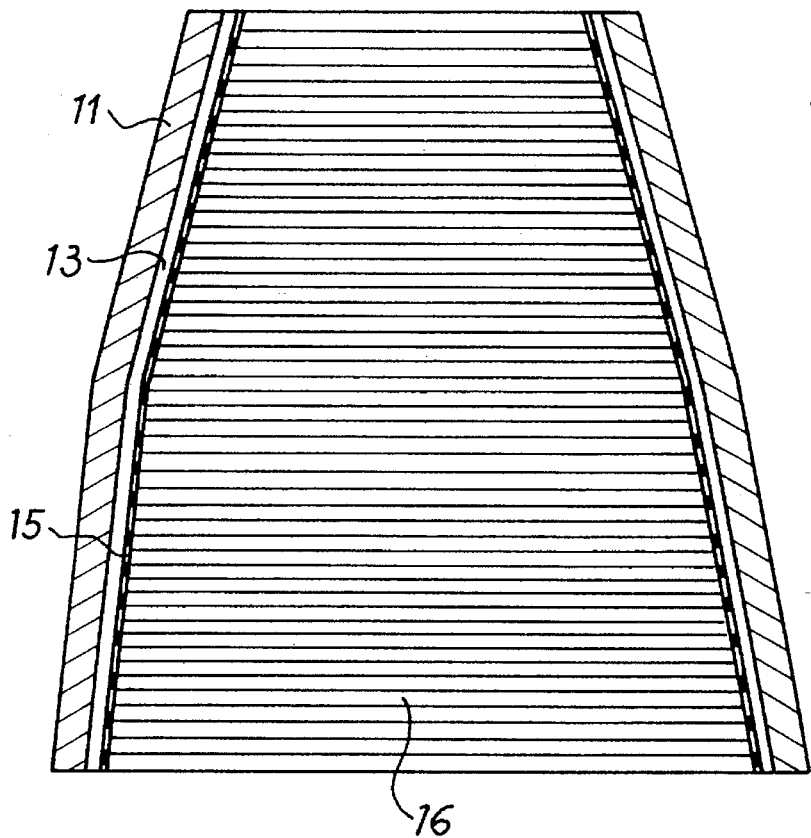
FIG. 1 is a longitudinally cross-sectional view of a truncated cone double cone structure carrier fitting on the spindle.
Figure 2:
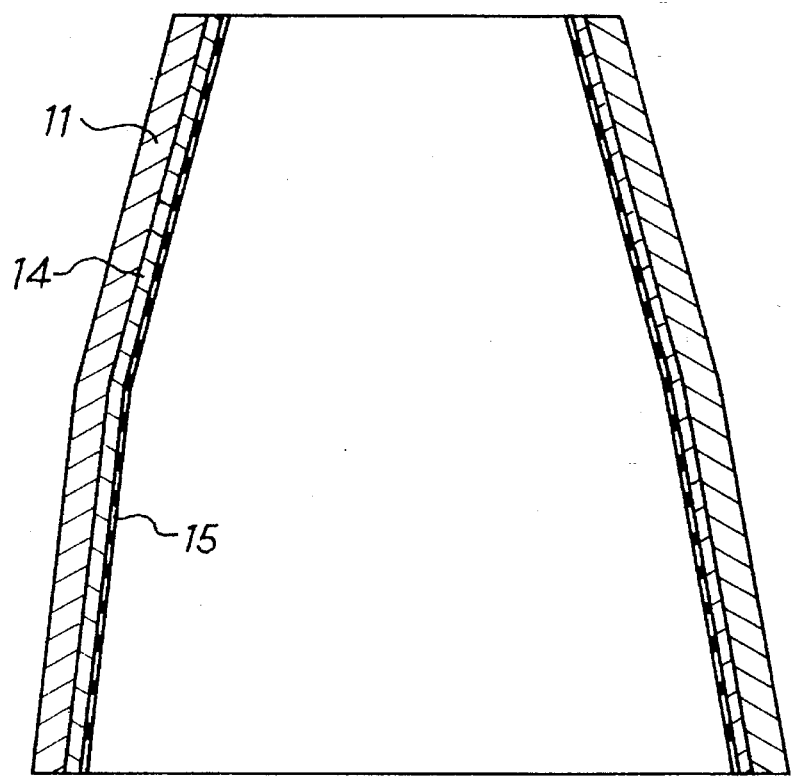
FIG. 2 is a longitudinal cross-sectional view of a mirror according to the present invention.

With reference to FIGS. 1 and 2, carrier 11 of ceramic material, prepared with the CVD process or another fabrication process, fits on spindle 16 of aluminium or other equivalent material, pre-covered with a layer 15 of gold having a typical thickness of about 100 nm. The dimensions of carrier 11 are such as to leave a gap 13, which may be about 0.1 mm, between said carrier 11 and spindle 16. Gap 13 is then filled with a fluid epoxy resin 14, which polymerizes and hardens, forming a layer which covers exactly the section of spindle 16. Spindle 16 is then separated by cooling, and in so doing one obtains the detachment of the mirror comprising the gold layer 15, which remains supported by the resin layer 14, anchored, in its turn, to carrier 11 of spindle 16. Carriers are obtained by means of a CVD process and are formed of silicon carbide (SIC) and boron azide (BN).

According to a variant of this embodiment, carriers may also be prepared by means of a reaction syntherization process and are formed of silicized silicon carbide and silicon. Such material is available on the market under the trademark CERAFORM, produced and sold by United Technology Optical System, West Palm Beach, Fla. (USA).

The utilization of carriers fabricated according to the present invention results in mirrors having a very wide range of thickness, generally between 0.3 and 10 mm. However, such carriers are particularly suitable for preparing mirrors having very reduced thicknesses typically between 0.4 and 1 mm.

The aforementioned materials, in particular, silicon carbide and boron azide, besides eliminating the above mentioned drawbacks arising from the utilization of nickel as the mechanical structural element, also allow the achievement of further advantages due to their physical-chemical characteristics specified in the table. In particular:

a) They provide the opportunity to obtain mirrors having a better mechanical stiffness with smaller thickness, as they have a modulus of elasticity and a specific stiffness much greater than nickel; and b) They can undergo more easily the replica grating operation, as they have, as has been already mentioned, a coefficient of thermal expansion much smaller than that of nickel. The mirrors according to the present invention have application not only in the field of X-ray telescopes, but also in other fields, such as, for instance, optics for X-ray microscopes and optics for lithographic applications.

Although the present invention has been described with reference to specific and particular realization conditions, it is obvious that those expert in the art can introduce alternatives and changes, without departing from the spirit and scope of the invention. Thus, the present invention covers any alternative or modification which falls within the concept and the scope of protection of the following claims.

What is claimed is:

1. Grazing incidence co-axial and confocal mirror, having a parabola/hyperbola double cone truncated cone structure, with polynomial sections or other geometric configurations, said mirror comprising an internal reflecting surface (15), constituted by a gold layer, an epoxy resin layer (14) on which said gold layer is supported, and a mechanical structural supporting element or carrier (11), to which the resin layer (14) is anchored, wherein said carrier (11) is a ceramic material having a specific weight less than 8.8 kg m$^{-3}$10$^3$, a coefficient of thermal expansion less than 14 K$^{-1}$10$^{-6}$1 a thermal conductivity greater than 90 W m$^{-1}$K$^{-1}$, a modulus of elasticity greater than 150 G Pa, a thermal distortion parameter greater than 0.6 W m$^{-1}$ and a specific stiffness greater than 17 MN kg$^{-1}$10.

2. The mirror according to claim 1, wherein the ceramic material has a specific weight between 2 and 4 kg m$^{-3}$10$^3$, a coefficient of thermal expansion between 2 and 5 K$^{-1}$10$^{-6}$, a thermal conductivity between 150 and 1300 W m$^{-1}$K$^{-1}$, a modulus of elasticity between 300 and 700 G Pa, a thermal distortion parameter between 5 and 28 W m$^{-1}$10$^7$ and a specific stiffness between 100 and 350 MN kg$^{-1}$10$^6$.

3. The mirror according to claim 1, wherein the carrier is prepared by means of a chemical vapour deposition process (CVD).

4. The mirror according to claim 1, wherein the ceramic material is silicon carbide.

5. The mirror according to claim 1, wherein the ceramic material is boron azide.

6. The mirror according to claim 1, wherein said carrier is made from silicized silicon carbide and is prepared by means of the reaction syntherization process.

7. The mirror according to claim 1, wherein said mirror has a thickness between 0.3 and 10 mm.

8. The mirror according to claim 1, wherein said mirror has a thickness between 0.4 and 1 mm.

9. Optics for X-ray telescopes used for astronomic observations, comprising a grazing incidence co-axial and confocal mirror, having a parabola/hyperbola double cone truncated cone structure, with polynomial sections or other geometric configurations, said mirror comprising an internal reflecting surface (15), constituted by a gold layer, an epoxy resin layer (14) on which said gold layer is supported, and a mechanical structural supporting element or carrier (11), to which the resin layer (14) is anchored, wherein said carrier (11) is a ceramic material having a specific weight less than 8.8 kg m$^{-3}$10$^3$, a coefficient of thermal expansion less than 14 K$^{-1}$10$^{-6}$, a thermal conductivity greater than 90 W m$^{-1}$K$^{-1}$, a modulus of elasticity greater than 150 G Pa, a thermal distortion parameter greater than 0.6 W m$^{-1}$ and a specific stiffness greater than 17 MN kg$^{-1}$10.

10. Optics for x-ray microscopes, comprising a grazing incidence co-axial and confocal mirror, having a parabola/hyperbola double cone truncated cone structure, with polynomial sections or other geometric configurations, said mirror comprising an internal reflecting surface (15), constituted by a gold layer, an epoxy resin layer (14) on which said gold layer is supported, and a mechanical structural supporting element or carrier (11), to which the resin layer (14) is anchored, wherein said carrier (11) is a ceramic material having a specific weight less than 8.8 kg m$^{-3}$10$^3$, a coefficient of thermal expansion less than 14 K$^{-1}$10$^{-6}$, a thermal conductivity greater than 90 W m$^{-1}$K$^{-1}$, a modulus of elasticity greater than 150 G Pa, a thermal distortion parameter greater than 0.6 W m$^{-1}$ and a specific stiffness greater than 17 MN kg$^{-1}$10.

11. Optics for lithographic use, comprising a grazing incidence co-axial and confocal mirror, having a parabola/hyperbola double cone truncated cone structure, with polynomial sections or other geometric configurations, said mirror comprising an internal reflecting surface (15), constituted by a gold layer, an epoxy resin layer (14) on which said gold layer is supported, and a mechanical structural supporting element or carrier (11), to which the resin layer (14) is anchored, wherein said carrier (11) is a ceramic material having a specific weight less than 8.8 kg m$^{-3}$10$^3$, a coefficient of thermal expansion less than 14 K$^{-1}$10$^{-6}$, a thermal conductivity greater than 90 W m$^{-1}$K$^{-1}$, a modulus of elasticity greater than 150 G Pa, a thermal distortion parameter greater than 0.6 W m$^{-1}$ and a specific stiffness greater than 17 MN kg$^{-1}$10.

* * * * *